United States Patent
Li et al.

(10) Patent No.: US 11,574,146 B2
(45) Date of Patent: Feb. 7, 2023

(54) METHOD FOR UPDATING PARAMETER OF MODEL, DISTRIBUTED TRAINING SYSTEM AND ELECTRIC DEVICE

(71) Applicant: BEIJING BAIDU NETCOM SCIENCE AND TECHNOLOGY CO., LTD., Beijing (CN)

(72) Inventors: Long Li, Beijing (CN); Haifeng Wang, Beijing (CN); Weibao Gong, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 322 days.

(21) Appl. No.: 17/104,165

(22) Filed: Nov. 25, 2020

(65) Prior Publication Data
US 2021/0287044 A1 Sep. 16, 2021

(30) Foreign Application Priority Data
Mar. 11, 2020 (CN) .......................... 202010167280.0

(51) Int. Cl.
*G06K 9/62* (2022.01)
*G06F 9/50* (2006.01)
*G06N 3/08* (2006.01)

(52) U.S. Cl.
CPC .......... *G06K 9/6257* (2013.01); *G06F 9/5038* (2013.01); *G06N 3/084* (2013.01)

(58) Field of Classification Search
None
See application file for complete search history.

(56) References Cited

U.S. PATENT DOCUMENTS

2021/0357814 A1* 11/2021 Wu ...................... G06N 3/084
2021/0406767 A1* 12/2021 Dong .................... G06N 20/00

OTHER PUBLICATIONS

Yanghua Peng et al., "A Generic Communication Scheduler for Distributed DNN Training Acceleration", SOSP'19, Oct. 27-30, 2019, Huntville, ON, Canada.
Shuo Ouyang et al., "Communication Optimization Strategies For Distributed Deep Learning: A Survey", A Preprint, Mar. 9, 2020, pp. 1-22.
Anand Jayarajan et al., "Priority-Based Parameter Propagation For Distributed DNN Training", Proceedings of the 2nd SysML Conference, 2019, Palo Alto, CA, USA.
TJ Klasen, "Search Report for EP Application No. 20209669.9", dated Jun. 11, 2021, EPO. Germany.

* cited by examiner

*Primary Examiner* — Dov Popovici
(74) *Attorney, Agent, or Firm* — Bridgeway IP Law Group, PLLC; Jihun Kim

(57) ABSTRACT

A method for updating a parameter of a model, a distributed training system, and an electric device are related to a field of deep learning technologies. The method includes: obtaining a batch training period of batch training data to be trained for a model; increasing priorities of tasks ranked at a bottom in a sequence of gradient communication tasks for parameters of the model when the batch training period is greater than or equal to a preset period threshold; and performing a communication of gradients of the parameters and updating the parameters based on priorities of the gradient communication tasks for the parameters in the model.

20 Claims, 5 Drawing Sheets

METHOD FOR UPDATING PARAMETER OF MODEL, DISTRIBUTED TRAINING SYSTEM AND ELECTRIC DEVICE

CROSS REFERENCE TO RELATED APPLICATIONS

This application is based on and claims priority to Chinese patent applications Serial No. 202010167280.0 filed on Mar. 11, 2020, the entire contents of which are incorporated herein by reference.

FIELD

The disclosure relates to a field of artificial intelligent technologies, more particularly to a field of deep learning technologies, and more particularly to a method for updating a parameter of a model, a distributed training system, and an electric device.

BACKGROUND

Presently, in a deep learning distributed training, a deep learning model is deployed on a plurality of training nodes. Full amount of training data is divided based on the number of training nodes, and each training node is assigned with a plurality of batches of batch training data. For each training node, after the deep learning model is trained with a batch of batch training data, a loss function is calculated, a gradient value of each parameter in the deep learning model is determined in combination with the loss function, and then the gradient value of the parameter is communicatively sent to other training nodes. In this way, each parameter at each training node is updated based on the gradient values of the parameters of all the training nodes.

In the above solution, there is a case where a same communication link is employed by a plurality of training tasks to send the gradient values of the parameters. If gradient values of parameters of a certain training task are transmitted continuously, the transmission of the gradient values of parameters of other training tasks may be affected, which may reduce a training speed and prolong a training period.

SUMMARY

The disclosure provides a method for updating a parameter of a model, a distributed training system, and an electric device.

A first aspect of embodiments of the disclosure provides a method for updating a parameter of a model. The method includes: obtaining a batch training period of batch training data to be trained for a model on a training node in a distributed training system; increasing priorities of tasks ranked at the bottom in a sequence of gradient communication tasks for parameters of the model when the batch training period is greater than or equal to a preset period threshold; and distributing gradients of the parameters of the model to other training nodes in the distributed training system based on priorities of the gradient communication tasks for the parameters, and updating the parameters of the model in combination with gradients of the parameters distributed by other training nodes.

Another aspect of embodiments of the disclosure provides an apparatus for updating a parameter of a model. The apparatus includes: an obtaining module, an adjusting module, and a parameter updating module.

The obtaining module is configured to obtain a batch training period of batch training data to be trained for a model on a training node in a distributed training system.

The adjusting module is configured to increase priorities of tasks ranked at the bottom in a sequence of gradient communication tasks for parameters of the model when the batch training period is greater than or equal to a preset period threshold.

The parameter updating module is configured to distribute gradients of the parameters in the model to other training nodes in the distributed training system based on priorities of the gradient communication tasks for the parameters, and to update the parameters of the model in combination with gradients of the parameters distributed by other training nodes.

Another aspect of embodiments of the disclosure provides a distributed training system. The distributed training system includes: a plurality of training nodes.

Any two training nodes in the plurality of training nodes are coupled with each other.

Each training node in the plurality of training nodes is configured to execute the method for updating the parameter of the model as described above.

Another aspect of embodiments of the disclosure provides an electronic device. The electronic device includes at least one processor and a memory. The memory is communicatively coupled to the at least one processor. The memory is configured to store instructions executed by the at least one processor. When the instructions are executed by the at least one processor, the at least one processor is caused to execute the method for updating the parameter of the model according to embodiments of the disclosure.

Another aspect of embodiments of the disclosure provides a non-transitory computer readable storage medium having computer instructions stored thereon. The computer instructions are configured to cause a computer to execute the method for updating the parameter of the model according to embodiments of the disclosure.

Other effects of the above alternative embodiments will be explained in the following with detailed embodiments.

BRIEF DESCRIPTION OF THE DRAWINGS

The accompanying drawings are used for better understanding the solution, and do not constitute a limitation of the disclosure.

DETAILED DESCRIPTION

Description will be made below to exemplary embodiments of the disclosure with reference to accompanying drawings, which includes various details of embodiments of the disclosure to facilitate understanding, and should be regarded as merely exemplary. Therefore, it should be recognized by the skilled in the art that various changes and modifications may be made to the embodiments described herein without departing from the scope and spirit of the disclosure. Meanwhile, for clarity and conciseness, descriptions for well-known functions and structures are omitted in the following description.

A method and an apparatus for updating a parameter of a model according to embodiments of the disclosure will be described below with reference to the accompanying drawings.

Figure 1:
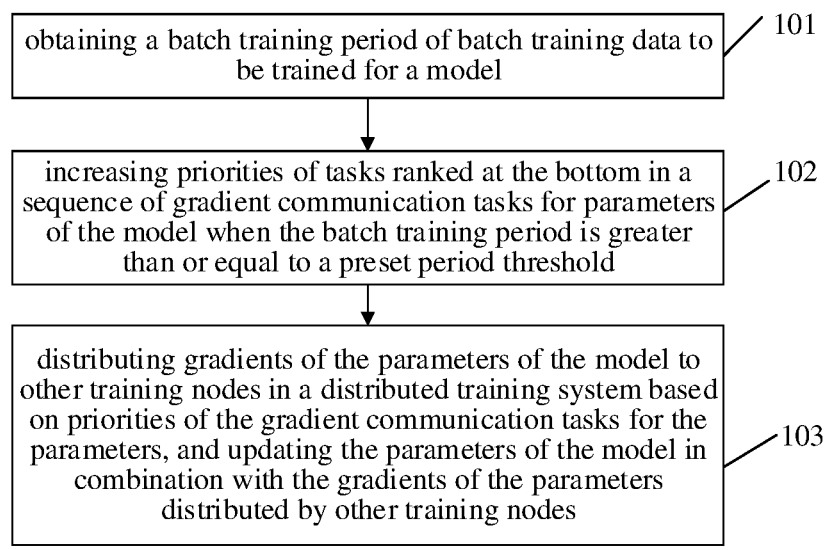
FIG. 1 is a flow chart according to a first embodiment of the disclosure.

FIG. 1 is a flow chart according to a first embodiment of the disclosure. It should be noted that, an executive subject of a method for updating a parameter of a model provided in this embodiment may be an apparatus for updating a parameter of a model. The apparatus for updating the parameter of the model may be hardware or software installed on the hardware, such as a terminal device or a server. In the disclosure, the apparatus for updating the parameter of the model is taken as a training node in a distributed training system for description.

As illustrated in FIG. 1, the method for updating the parameter of the model may include the following.

At block 101, a batch training period of batch training data to be trained for a model is obtained.

In the disclosure, before the action at block 101, the method also includes: obtaining a model to be trained which is deployed on a training node, training data assigned to the model on the training node and a sequence of gradient communication tasks for parameters of the model. The training data includes: a plurality of batches of batch training data. The sequence of gradient communication tasks for the parameters of the model includes a gradient communication task for each parameter and a priority corresponding to the gradient communication task.

In the disclosure, the training data assigned to the model on the training node may be obtained by means of: obtaining the total number of training nodes in a distributed training system, segmenting the full amount of training data of the model based on the total number to obtain a plurality of segmented training data, the number of the plurality of segmented training data being consistent with the total number, and distributing the plurality of segmented training data to the training nodes, respectively.

In the disclosure, the sequence of gradient communication tasks for the parameters of the model may be obtained by means of: sequencing gradient communication tasks for the parameters of each layer in the model based on a back propagation direction to obtain the sequence of gradient communication tasks for the parameters; and performing priority setting on each task in the sequence of gradient communication tasks for the parameters, such that the priorities of the gradient communication tasks are sequenced in an ascending order.

In the disclosure, there may be a plurality of parameters in the model when the model has a large scale, but there may be the less number of layers of the model. Therefore, transmission of gradients of all parameters in one layer may be regarded as a gradient communication task. In the disclosure, for an example, taking the transmission of the gradients of all the parameters in one layer as one gradient communication task, in order to facilitate priority adjustment, the tasks in the sequence of gradient communication tasks for the parameters may be divided into different groups in turn to obtain a group sequence. When the priority adjustment is performed, the priority adjustment may be performed on the groups. The groups in the group sequence may be generated by means of: when a ratio between the number of tasks in the sequence of gradient communication tasks for the parameters and the number of groups in the group sequence is greater than a preset ratio threshold, segmenting the tasks in the sequence of gradient communication tasks for the parameters into N equal parts, N being the number of groups in the group sequence, and distributing the N equal parts sequentially to the groups in the group sequence.

When the ratio of the number of tasks in the sequence of gradient communication tasks for the parameters to the number of groups in the group sequence is lower than or equal to the preset ratio threshold, in a first scene, if the number of tasks is M and the number of groups is N, M/N+M % N tasks are distributed to the first group, and M/N tasks are distributed to each group other than the first group. In a second scene, the last task in the sequence of gradient communication tasks for the parameters may be distributed to the last group in the group sequence, the penultimate task and the antepenultimate task in the sequence of gradient communication tasks for the parameters may be distributed to the penultimate group in the group sequence, and so on. Finally, all the remaining tasks are distributed to the first group in the group sequence.

In the disclosure, the batch training data to be trained may be untrained batch training data in training data of the model, or batch training data whose training round is lower than a preset round threshold.

At block 102, priorities of tasks ranked at the bottom in the sequence of gradient communication tasks for the parameters of the model are increased when the batch training period is greater than or equal to a preset period threshold.

In the disclosure, the calculation and communication procedure of the gradient of the parameter may be as follows. It is assumed that the model includes four layers, which are respectively the first layer, the second layer, the third layer and the fourth layer from an input end to an output end. Performing back propagation on the model refers to a process for calculating the gradients of the parameters of each layer from the output end to the input end of the model in combination with a loss function of the model. Gradients of parameters of the fourth layer, i.e., gradients of parameters at a head end of a back propagation stage, are calculated first, where the gradients of the parameters refer to gradient values of the parameters from the output end to the fourth layer. After the gradients of the parameters of the fourth layer are calculated, gradients of parameters of the third layer, i.e., gradient values of the parameters from the output end to the third layer are calculated. Then gradients of parameters of the second layer and gradients of parameters of the first layer are calculated. The gradients of the parameters of each layer are determined in combination with the loss function of the model. For example, after the calculation of the gradients of the parameters of the fourth layer is completed, the training node needs to communicatively transmit the gradients of the parameters of the fourth layer to other training nodes and receives gradients of parameters transmitted by other training nodes. In this way, for each parameter of the fourth layer, the parameter of the fourth layer may be updated in combination with the gradients of the parameter from respective training nodes. For example, an average value of the gradients of the parameter from respective training nodes may be obtained, and a product of the average value and a learning rate may be subtracted from a pre-training value of the parameter to obtain an updated value of the parameter.

A communication period of the gradients of the parameters of the fourth layer may coincide with a calculation period of the gradients of the parameters of the third layer. A communication period of the gradients of the parameters of the third layer may coincide with a calculation period of the gradients of the parameters of the second layer. A communication period of the gradients of the parameters of the second layer may coincide with a calculation period of the gradients of the parameters of the first layer. However, a communication period of the gradients of the parameters of the first layer needs to occupy extra communication period. Therefore, if the training task of the training node is affected by other training tasks because the communication link is shared, it may be because the communication link is occupied by other training tasks when the communication of gradients of the parameters of the first layer is needed. Therefore, when the batch training period is greater than or equal to the preset period threshold, the priority of the task ranked at the bottom in the sequence of gradient communication tasks for the parameters needs to be improved. In the above example, the priority of the gradient communication task for the parameters of the first layer is increased, and when the gradient communication task of the parameters of the first layer is executed, compared with other training tasks sharing the communication link, the gradient communication task of the parameters of the first layer may be executed preferentially, thereby avoiding waiting and the influence of other training tasks. The bottom ranked gradient communication task for the parameters is a gradient communication task for the parameters of a layer near the input end of the model. The top ranked gradient communication task for the parameters is a gradient communication task for the parameters of a layer near the output end of the model.

In the disclosure, since a minimum batch training period fluctuates, a sum of the minimum batch training period and a preset coefficient may be used as the preset period threshold. The preset coefficient may be comprehensively set based on the experience of the user and the period required for processing the batch training data.

In the disclosure, a process of the training node performing the action at block 102 may include: when the batch training period is greater than or equal to the preset period threshold, selecting a task to be adjusted and an adjusted priority corresponding to the task to be adjusted from the tasks ranked at the bottom in the sequence of gradient communication tasks for the parameters based on a preset priority adjustment strategy; and performing priority adjustment on the task to be adjusted based on the task to be adjusted and the adjusted priority corresponding to the task to be adjusted. The tasks to be adjusted may be, such as, a plurality of tasks sequenced at the bottom in the sequence of gradient communication tasks for the parameters of the model.

Further, on the basis of the above embodiments, the method may also include: determining the batch training period as an updated minimum batch training period when the batch training period is lower than the minimum batch training period. In this way, the minimum batch training period may be adjusted in time and the preset period threshold may be adjusted at the same time.

At block 103, gradients of the parameters in the model are distributed to other training nodes in a distributed training system based on priorities of the gradient communication tasks for the parameters, and the parameters of the model are updated in combination with the gradients of the parameter distributed by the other training nodes.

In addition, in embodiments of the disclosure, a model may be configured for image recognition, image comparison and so on. For example, when the model is configured for the image recognition, if the parameters of model are updated by employing the embodiment illustrated in FIG. 1 in the process of model training, the influence of the gradient communication tasks for the parameters of other training tasks on a gradient communication task for the parameters of a current training task may be avoided, such that the training period may be reduced, the training speed may be improved, the model with high accuracy may be obtained as soon as possible for the image recognition, and the efficiency of the image recognition is improved.

With the method for updating the parameter of the model according to embodiments of the disclosure, the batch training period of the batch training data to be trained is obtained for the model, the priorities of tasks ranked at the bottom in the sequence of gradient communication tasks for the parameters of the model are increased when the batch training period is greater than or equal to the preset period threshold, the gradients of the parameters in the model are distributed to other training nodes in the distributed training system based on the priorities of the gradient communication tasks for the parameters, and the parameters of the model are updated in combination with the gradients of the parameters distributed by other training nodes. In this way, the priority of the gradient communication task may be adjusted in combination with the batch training period, such that the influence of gradient communication tasks for the parameters of other training tasks on a gradient communication task for parameters of the current training task is avoided, thus reducing the training period and improving the training speed.

Figure 2:
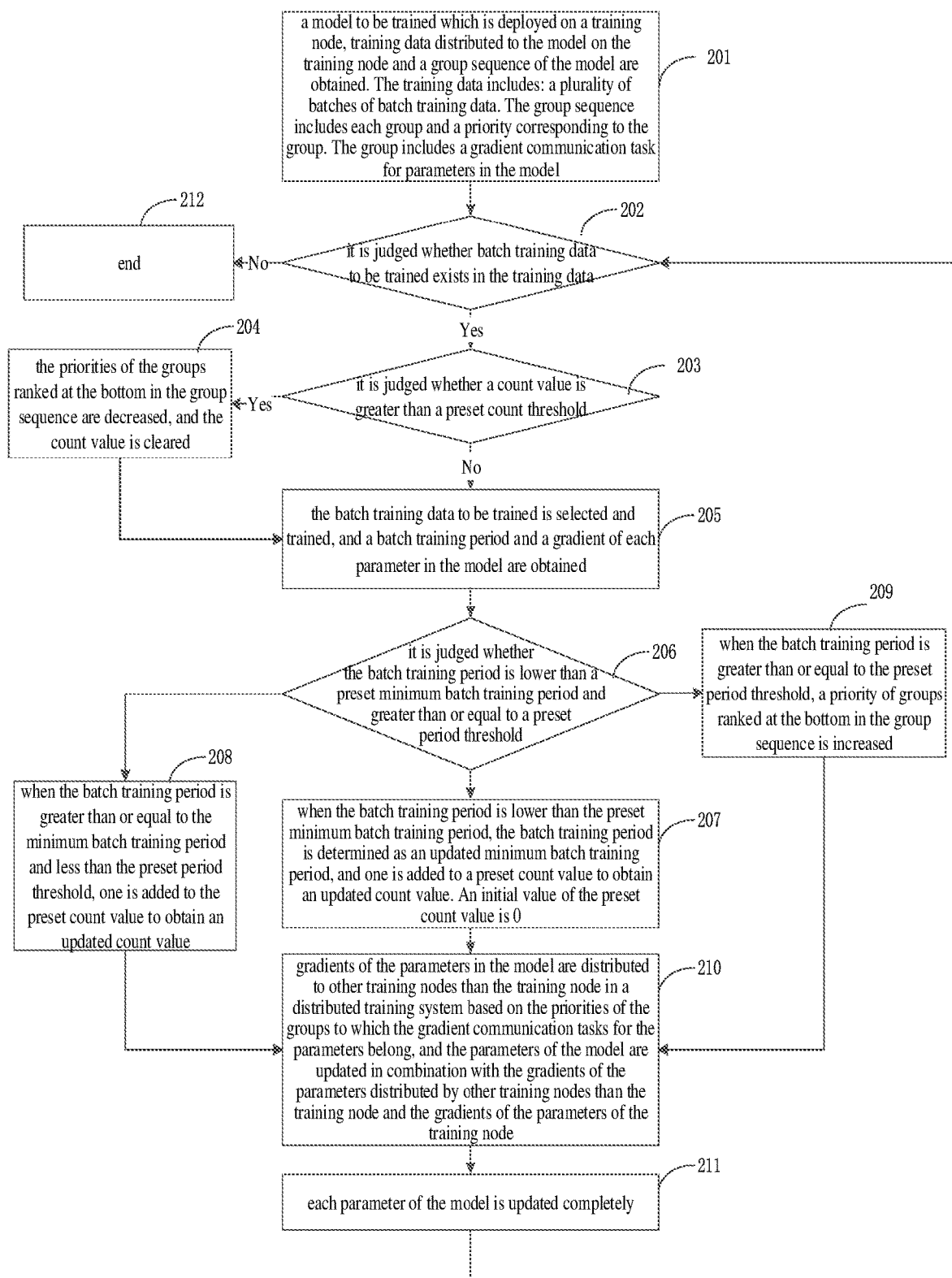
FIG. 2 is a flow chart according to a second embodiment of the disclosure.

FIG. 2 is a flow chart according to a second embodiment of the disclosure. As illustrated in FIG. 2, the method for updating the parameter of the model may include the following.

At block 201, a model to be trained which is deployed on a training node, training data assigned to the model on the training node and a group sequence of the model are obtained. The training data includes: a plurality of batches of batch training data. The group sequence includes each group and a priority corresponding to the group. The group includes a gradient communication task for parameters in the model.

At block 202, it is judged whether batch training data to be trained exists in the training data. If yes, the action at block 203 is performed; otherwise, the action at block 212 is performed.

At block 203, it is judged whether a count value is greater than a preset count threshold when the batch training data to be trained exists in the training data. If yes, the action at block 204 is performed; otherwise, the action at block 205 is performed.

At block 204, the priorities of the groups ranked at the bottom in the group sequence are decreased, and the count value is cleared.

In the disclosure, when the count value is greater than the preset count threshold, it means that when a communication of the gradients of the parameters is performed, the gradient communication task for the parameters of this training task is preferentially executed, while the gradient communication tasks for the parameters of other training tasks sharing the communication link are waiting. Moreover, when the gradient communication task for the parameters of this training task is performed preferentially for many times, it is possible that a high-priority communication may cause long-term blockage of a low-priority communication, which may cause long-term waiting of the gradient communication tasks for the parameters of other training tasks. Therefore, it is required to decrease the priority of the group ranked at the bottom in the group sequence of this training task, to avoid affecting the training of other training tasks using the shared communication link.

At block 205, the batch training data to be trained is selected and trained, and a batch training period and a gradient of each parameter in the model are obtained.

At block 206, it is judged whether the batch training period is lower than a preset minimum batch training period and greater than or equal to a preset period threshold.

At block 207, when the batch training period is lower than the preset minimum batch training period, the batch training period is determined as an updated minimum batch training period, and one is added to a preset count value to obtain an updated count value. An initial value of the preset count value is 0.

At block 208, when the batch training period is greater than or equal to the minimum batch training period and less than the preset period threshold, one is added to the preset count value to obtain an updated count value.

At block 209, when the batch training period is greater than or equal to the preset period threshold, the priority of group ranked at the bottom in the group sequence is increased.

At block 210, gradients of the parameters in the model are distributed to other training nodes than the training node in a distributed training system based on the priorities of the groups to which the gradient communication tasks for the parameters belong, and the parameters of the model are updated in combination with the gradients of the parameters of other training nodes than the training node and the gradients of the parameters of the training node.

At block 211, the action at block 203 is executed repeatedly after each parameter of the model is updated.

At block 212, end.

With the method for updating the parameter of the model according to embodiments of the disclosure, the model to be trained which is deployed on the training node, the training data distributed to the model on the training node and the group sequence of the model are obtained. The training data includes: the plurality of batches of batch training data. The group sequence includes each group and the priority corresponding to the group. The group includes the gradient communication task for the parameters in the model. It is judged whether the batch training data to be trained exists in the training data. It is judged whether the count value is greater than the preset count threshold when the batch training data to be trained exists in the training data. When the count value is greater than the preset count threshold, the count value is cleared. Then the batch training data to be trained is selected and trained, and the batch training period and the gradient of each parameter in the model are obtained. When the batch training period is greater than or equal to the preset period threshold, the priority of group ranked at the bottom in the group sequence is increased. The preset period threshold is the sum of the preset minimum batch training period and the preset coefficient. The gradients of the parameters in the model are distributed to other training nodes than the training node in the distributed training system based on the priorities of the groups to which the gradient communication tasks for the parameters belong, and the parameters of the model are updated in combination with the gradients of the parameters of other training nodes than the training node and the gradients of the parameters of the training node. In this way, the priority of each group may be adjusted in combination with the batch training period, so as to realize the adjustment of the priorities of the gradient communication tasks for the parameters, such that the influence of gradient communication tasks for the parameters of other training tasks on a gradient communication task for the parameters of the current training task may be avoided, thus reducing the training period and improving the training speed.

To achieve the above embodiments, embodiments of the disclosure also provide an apparatus for updating a parameter of a model.

Figure 3:
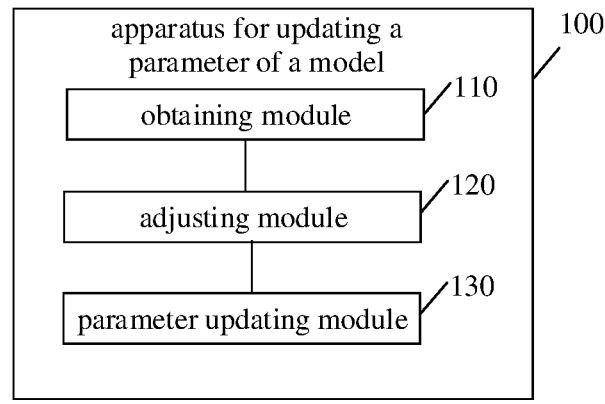
FIG. 3 is a block diagram according to a third embodiment of the disclosure.

FIG. 3 is a block diagram according to a third embodiment of the disclosure. As illustrated in FIG. 3, the apparatus 100 for updating the parameter of the model includes an obtaining module 110, an adjusting module 120, and a parameter updating module 130.

The obtaining module 110 is configured to obtain a batch training period of batch training data to be trained for a model.

The adjusting module 120 is configured to increase priorities of tasks ranked at the bottom in a sequence of gradient communication tasks for parameters of the model when the batch training period is greater than or equal to a preset period threshold.

The parameter updating module 130 is configured to distribute gradients of the parameters in the model to other training nodes in a distributed training system based on priorities of the gradient communication tasks for the parameters, and to update the parameters of the models in combination with the gradients of the parameters distributed by the other training nodes.

Figure 4:
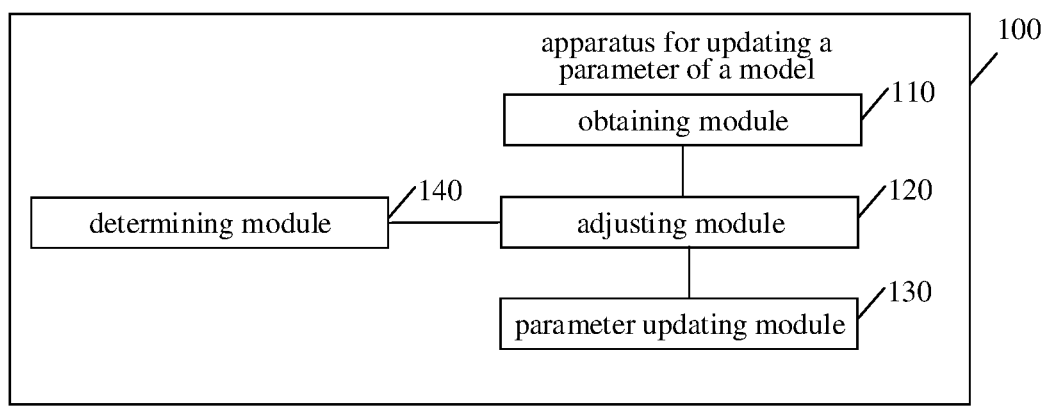
FIG. 4 is a block diagram according to a fourth embodiment of the disclosure.

In an embodiment of the disclosure, in combination with FIG. 4, on the basis of the embodiment illustrated in FIG. 3, the preset period threshold is a sum of a preset minimum batch training period and a preset coefficient. The apparatus also includes: a determining module 140, configured to determine the batch training period as an updated minimum batch training period when the batch training period is lower than the preset minimum batch training period.

Figure 5:
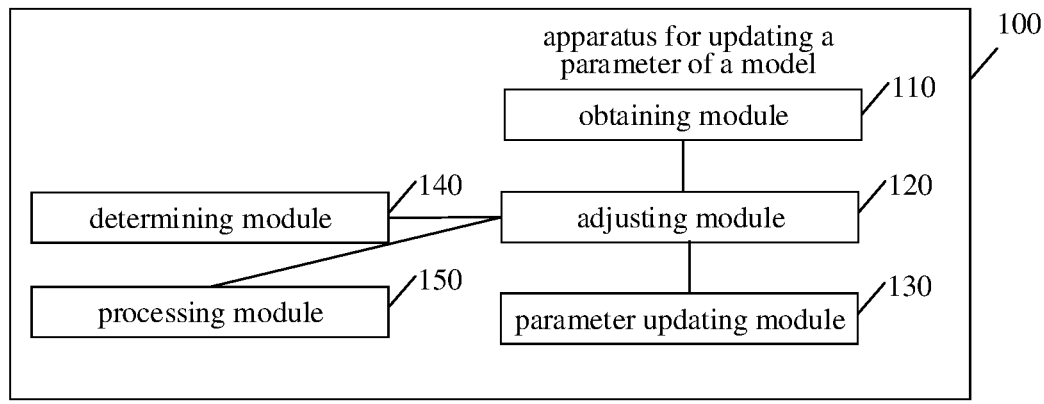
FIG. 5 is a block diagram according to a fifth embodiment of the disclosure.

In an embodiment of the disclosure, in combination with FIG. 5, on the basis of the embodiment illustrated in FIG. 3, the apparatus may also include a processing module 150.

The processing module 150 is configured to add one to a preset count value to obtain an updated count value when the batch training period is lower than the preset minimum batch training period. An initial value of the preset count value is 0.

The processing module 150 is also configured to add one to the preset count value to obtain an updated count value when the batch training period is greater than or equal to the preset minimum batch training period and less than the preset period threshold.

Figure 6:
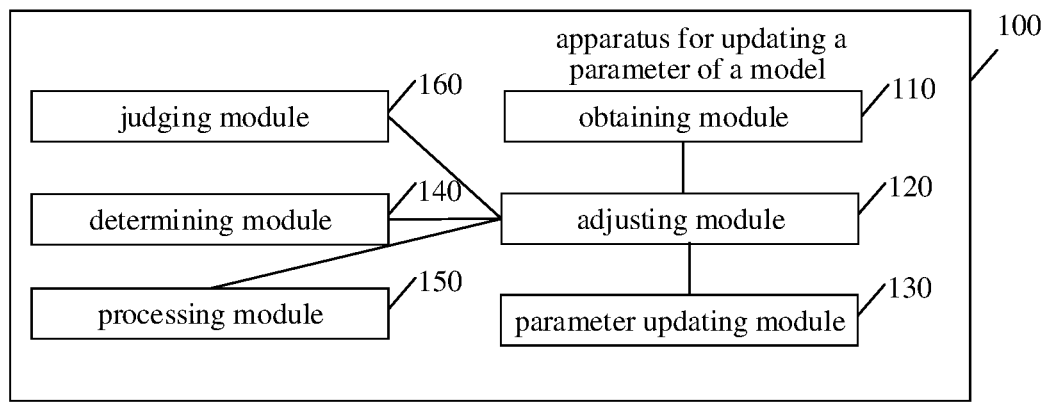
FIG. 6 is a block diagram according to a sixth embodiment of the disclosure.

In an embodiment of the disclosure, in combination with FIG. 6, on the basis of the embodiment illustrated in FIG. 5, the apparatus also includes a judging module 160.

The obtaining module 110 is also configured to obtain the preset count value.

The judging module 160 is also configured to judge whether the preset count value is greater than a preset count threshold.

The adjusting module 120 is also configured to: when the preset count value is greater than the preset count threshold, decrease the priorities of the tasks ranked at the bottom in the sequence of gradient communication tasks for the parameters, and clear the preset count value.

In an embodiment of the disclosure, the adjusting module 120 is also configured to: when the batch training period is greater than or equal to the preset period threshold, select a task to be adjusted and an adjusted priority corresponding to the task to be adjusted from the tasks ranked at the bottom in the sequence of gradient communication tasks for the parameters based on a preset priority adjustment strategy; and perform priority adjustment on the task to be adjusted based on the task to be adjusted and the adjusted priority corresponding to the task to be adjusted.

In an embodiment of the disclosure, the sequence of gradient communication tasks for the parameters of the model is obtained by means of: sequencing gradient communication tasks for the parameters of each layer in the model based on a back propagation direction to obtain the sequence of gradient communication tasks for the parameters; and performing priority setting on each task in the sequence of gradient communication tasks for the parameters, such that the priorities of the gradient communication tasks are sequenced in an ascending order.

In an embodiment of the disclosure, the batch training data to be trained is untrained batch training data in training data of the model, or batch training data whose training round is lower than a preset round threshold.

With the apparatus for updating the parameter of the model according to embodiments of the disclosure, the batch training period of the batch training data to be trained is obtained for the model, the priorities of tasks ranked at the bottom in the sequence of gradient communication tasks for the parameters of the model are increased when the batch training period is greater than or equal to the preset period threshold, the gradients of the parameters in the model are distributed to other training nodes in the distributed training system based on the priorities of the gradient communication tasks for the parameters, and the parameters of the model are updated in combination with the gradients of the parameters distributed by other training nodes. In this way, the priority of the gradient communication task may be adjusted in combination with the batch training period, such that the influence of gradient communication tasks for the parameters of other training tasks on a gradient communication task for parameters of the current training task is avoided, thus reducing the training period and improving the training speed.

According to embodiments of the disclosure, the disclosure also provides a distributed training system. The distributed training system includes: a plurality of training nodes.

Any two training nodes in the plurality of training nodes are coupled with each other.

Each training node in the plurality of training nodes is configured to execute the method for updating the parameter of the model illustrated in FIG. 1 and FIG. 2.

According to embodiments of the disclosure, the disclosure also provides an electronic device and a readable storage medium.

Figure 7:
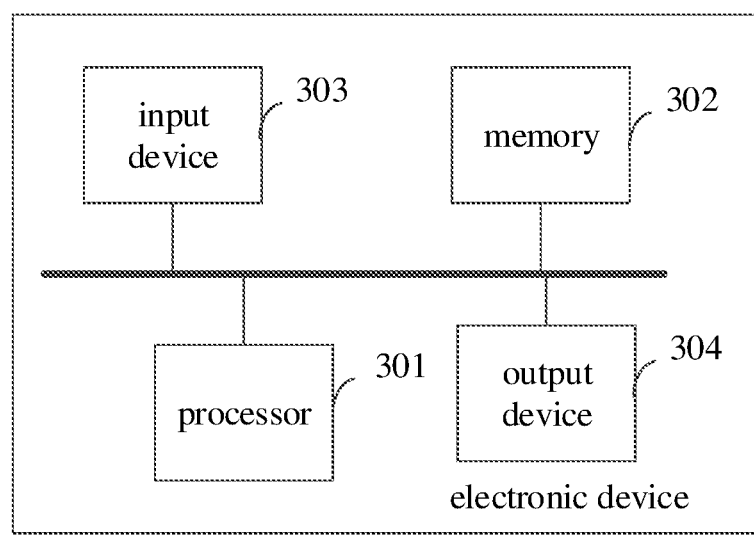
FIG. 7 is a schematic diagram illustrating an electronic device capable of implementing a method for updating a parameter of a model according to embodiments of the disclosure.

As illustrated in FIG. 7, FIG. 7 is a block diagram illustrating an electronic device capable of implementing a method for updating a parameter of a model according to embodiments of the disclosure. The electronic device aims to represent various forms of digital computers, such as a laptop computer, a desktop computer, a workstation, a personal digital assistant, a server, a blade server, a mainframe computer and other suitable computer. The electronic device may also represent various forms of mobile devices, such as personal digital processing, a cellular phone, an intelligent phone, a wearable device and other similar computing device. The components, connections and relationships of the components, and functions of the components illustrated herein are merely examples, and are not intended to limit the implementation of the disclosure described and/or claimed herein.

As illustrated in FIG. 7, the electronic device includes: one or more processors 301, a memory 302, and interfaces for connecting various components, including a high-speed interface and a low-speed interface. Various components are connected to each other by different buses, and may be installed on a common main board or in other ways as required. The processor may process instructions executed within the electronic device, including instructions stored in or on the memory to display graphical information of the GUI (graphical user interface) on an external input/output device (such as a display device coupled to an interface). In other implementations, a plurality of processors and/or a plurality of buses may be used together with a plurality of memories if desired. Similarly, a plurality of electronic devices may be connected, and each device provides some necessary operations (such as, as a server array, a group of blade servers, or a multiprocessor system). In FIG. 7, a processor 301 is taken as an example.

The memory 302 is a non-transitory computer readable storage medium provided by the disclosure. The memory is configured to store instructions executed by at least one processor, to enable the at least one processor to execute a method for updating a parameter of a model according to the disclosure. The non-transitory computer readable storage medium according to the disclosure is configured to store computer instructions. The computer instructions are configured to enable a computer to execute the method for method for updating the parameter of the model according to the disclosure.

As the non-transitory computer readable storage medium, the memory 302 may be configured to store non-transitory software programs, non-transitory computer executable programs and modules, such as program instructions/modules (such as, the obtaining module 110, the adjusting module 120, and the parameter updating module 130 illustrated in FIG. 3, the determining module 140 illustrated in FIG. 4, the processing module 150 illustrated in FIG. 5, and the judging module 160 illustrated in FIG. 6) corresponding to the method for updating the parameter of the model according to embodiments of the disclosure. The processor 301 is configured to execute various functional applications and data processing of the server by operating non-transitory software programs, instructions and modules stored in the memory 302, that is, implements the method for updating the parameter of the model according to the above method embodiment.

The memory 302 may include a storage program region and a storage data region. The storage program region may store an application required by an operating system and at least one function. The storage data region may store data created according to usage of the electronic device updated based on the model parameter. In addition, the memory 302 may include a high-speed random access memory, and may also include a non-transitory memory, such as at least one disk memory device, a flash memory device, or other non-transitory solid-state memory device. In some embodiments, the memory 302 may alternatively include memories remotely located to the processor 301, and these remote memories may be connected to the electronic device updated based on the parameter of the model through a network. Examples of the above network include, but are not limited to, an Internet, an intranet, a local area network, a mobile communication network and combinations thereof.

The electronic device for performing the method for updating the parameter of the model may also include: an input device 303 and an output device 304. The processor 301, the memory 302, the input device 303, and the output device 304 may be connected through a bus or in other means. In FIG. 7, the bus is taken as an example.

The input device 303 may receive inputted digital or character information, and generate key signal input related to user setting and function control of the electronic device updated based on the model parameter, such as a touch screen, a keypad, a mouse, a track pad, a touch pad, an indicator stick, one or more mouse buttons, a trackball, a joystick and other input device. The output device 304 may include a display device, an auxiliary lighting device (e.g., LED), a haptic feedback device (such as, a vibration motor), and the like. The display device may include, but be not limited to, a liquid crystal display (LCD), a light emitting diode (LED) display, and a plasma display. In some implementations, the display device may be the touch screen.

The various implementations of the system and technologies described herein may be implemented in a digital electronic circuit system, an integrated circuit system, an application specific ASIC (application specific integrated circuit), computer hardware, firmware, software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device, and at least one output device, and may transmit the data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including machine readable medium that receives machine instructions as a machine readable signal. The term "machine readable signal" refers to any signal for providing the machine instructions and/or data to the programmable processor.

To provide interaction with the user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of apparatus may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system (such as, a data server) including a background component, a computing system (such as, an application server) including a middleware component, or a computing system including a front-end component (such as, a user computer having a graphical user interface or a web browser, through which the user may interact with embodiments of the system and technologies described herein), or a computing system including any combination of the background component, the middleware components, or the front-end component. Components of the system may be connected to each other through digital data communication in any form or medium (such as, a communication network). Examples of the communication network include a local area network (LAN), a wide area networks (WAN), the Internet, and a blockchain network.

The computer system may include a client and a server. The client and the server are generally remote from each other and usually interact through the communication network. A relationship between the client and the server is generated by computer programs operated on a corresponding computer and having a client-server relationship with each other.

It should be understood that, steps may be reordered, added or deleted by utilizing flows in the various forms illustrated above. For example, the steps described in the disclosure may be executed in parallel, sequentially or in different orders, so long as a desired result of the technical solution disclosed in the disclosure may be achieved, there is no limitation here.

The above detailed implementation do not limit the protection scope of the disclosure. It should be understood by the skilled in the art that, various modifications, combinations, sub-combinations and substitutions may be made based on design requirements and other factors. Any modification, equivalent substitution and improvement made within the spirit and principle of the disclosure shall be included in the protection scope of disclosure.

What is claimed is:

1. A method for updating a parameter of a model, comprising:
    obtaining a batch training period of batch training data to be trained for the model on a training node in a distributed training system;
    increasing priorities of tasks ranked at a bottom in a sequence of gradient communication tasks for parameters of the model when the batch training period is greater than or equal to a preset period threshold; and
    distributing gradients of the parameters of the model to other training nodes in the distributed training system based on priorities of the gradient communication tasks for the parameters, and updating the parameters of the model in combination with gradients of the parameters distributed by the other training nodes.

2. The method of claim 1, wherein the preset period threshold is a sum of a preset minimum batch training period and a preset coefficient.

3. The method of claim 2, further comprising:
    determining the batch training period as an updated minimum batch training period and adding one to a preset count value to obtain an updated count value, when the batch training period is lower than the preset minimum batch training period, an initial value of the preset count value being 0; and
    adding one to the preset count value to obtain an updated count value when the batch training period is greater than or equal to the preset minimum batch training period and less than the preset period threshold.

4. The method of claim 3, wherein the method further comprises:
obtaining the preset count value;
judging whether the preset count value is greater than a preset count threshold; and
when the preset count value is greater than the preset count threshold, decreasing the priorities of the tasks ranked at the bottom in the sequence of gradient communication tasks for the parameters, and clearing the preset count value.

5. The method of claim 1, wherein increasing the priorities of the tasks ranked at the bottom in the sequence of gradient communication tasks for the parameters of the model when the batch training period is greater than or equal to the preset period threshold comprises:
when the batch training period is greater than or equal to the preset period threshold, selecting a task to be adjusted and an adjusted priority corresponding to the task to be adjusted from the tasks ranked at the bottom in the sequence of gradient communication tasks of the parameters based on a preset priority adjustment strategy; and
performing priority adjustment on the task to be adjusted based on the task to be adjusted and the adjusted priority corresponding to the task to be adjusted.

6. The method of claim 1, wherein the sequence of gradient communication tasks for the parameters of the model is obtained by means of:
sequencing gradient communication tasks for the parameters of each layer in the model based on a back propagation direction to obtain the sequence of gradient communication tasks for the parameters; and
performing priority setting on each task in the sequence of gradient communication tasks for the parameters, such that the priorities of the gradient communication tasks are sequenced in an ascending order.

7. The method of claim 1, wherein the batch training data to be trained is untrained batch training data in training data of the model, or batch training data whose training round is lower than a preset round threshold.

8. A distributed training system, comprising: a plurality of training nodes,
wherein any two training nodes in the plurality of training nodes are coupled with each other; and each training node in the plurality of training nodes is configured to execute a method for updating a parameter of a model, comprising:
obtaining a batch training period of batch training data to be trained for a model on a training node in the distributed training system;
increasing priorities of tasks ranked at a bottom in a sequence of gradient communication tasks for parameters of the model when the batch training period is greater than or equal to a preset period threshold; and
distributing gradients of the parameters of the model to other training nodes in the distributed training system based on priorities of the gradient communication tasks for the parameters, and updating the parameters of the model in combination with gradients of the parameters distributed by the other training nodes.

9. The system of claim 8, wherein the preset period threshold is a sum of a preset minimum batch training period and a preset coefficient.

10. The system of claim 9, wherein the method further comprises:

determining the batch training period as an updated minimum batch training period and adding one to a preset count value to obtain an updated count value, when the batch training period is lower than the preset minimum batch training period, an initial value of the preset count value being 0; and
adding one to the preset count value to obtain an updated count value when the batch training period is greater than or equal to the preset minimum batch training period and less than the preset period threshold.

11. The system of claim 10, wherein the method further comprises:
obtaining the preset count value;
judging whether the preset count value is greater than a preset count threshold; and
when the preset count value is greater than the preset count threshold, decreasing the priorities of the tasks ranked at the bottom in the sequence of gradient communication tasks for the parameters, and clearing the preset count value.

12. The system of claim 8, wherein increasing the priorities of the tasks ranked at the bottom in the sequence of gradient communication tasks for the parameters of the model when the batch training period is greater than or equal to the preset period threshold comprises:
when the batch training period is greater than or equal to the preset period threshold, selecting a task to be adjusted and an adjusted priority corresponding to the task to be adjusted from the tasks ranked at the bottom in the sequence of gradient communication tasks of the parameters based on a preset priority adjustment strategy; and
performing priority adjustment on the task to be adjusted based on the task to be adjusted and the adjusted priority corresponding to the task to be adjusted.

13. The system of claim 8, wherein the sequence of gradient communication tasks for the parameters of the model is obtained by means of:
sequencing gradient communication tasks for the parameters of each layer in the model based on a back propagation direction to obtain the sequence of gradient communication tasks for the parameters; and
performing priority setting on each task in the sequence of gradient communication tasks for the parameters, such that the priorities of the gradient communication tasks are sequenced in an ascending order.

14. The system of claim 8, wherein the batch training data to be trained is untrained batch training data in training data of the model, or batch training data whose training round is lower than a preset round threshold.

15. An electronic device, comprising:
at least one processor; and
a memory, communicatively coupled to the at least one processor,
wherein the memory is configured to store instructions executed by the at least one processor, and when the instructions are executed by the at least one processor, the at least one processor is caused to execute a method for updating a parameter of a model, comprising:
obtaining a batch training period of batch training data to be trained for the model on a training node in a distributed training system;
increasing priorities of tasks ranked at a bottom in a sequence of gradient communication tasks for parameters of the model when the batch training period is greater than or equal to a preset period threshold; and distributing gradients of the parameters of the model to other training nodes in the distributed training system based on priorities of the gradient communication tasks for the parameters, and updating the parameters of the model in combination with gradients of the parameters distributed by the other training nodes.

16. The device of claim 15, wherein the preset period threshold is a sum of a preset minimum batch training period and a preset coefficient.

17. The device of claim 16, wherein the method further comprises:
  determining the batch training period as an updated minimum batch training period and adding one to a preset count value to obtain an updated count value, when the batch training period is lower than the preset minimum batch training period, an initial value of the preset count value being 0; and
  adding one to the preset count value to obtain an updated count value when the batch training period is greater than or equal to the preset minimum batch training period and less than the preset period threshold.

18. The device of claim 17, wherein the method further comprises:
  obtaining the preset count value;
  judging whether the preset count value is greater than a preset count threshold; and
  when the preset count value is greater than the preset count threshold, decreasing the priorities of the tasks ranked at the bottom in the sequence of gradient communication tasks for the parameters, and clearing the preset count value.

19. The device of claim 15, wherein increasing the priorities of the tasks ranked at the bottom in the sequence of gradient communication tasks for the parameters of the model when the batch training period is greater than or equal to the preset period threshold comprises:
  when the batch training period is greater than or equal to the preset period threshold, selecting a task to be adjusted and an adjusted priority corresponding to the task to be adjusted from the tasks ranked at the bottom in the sequence of gradient communication tasks of the parameters based on a preset priority adjustment strategy; and
  performing priority adjustment on the task to be adjusted based on the task to be adjusted and the adjusted priority corresponding to the task to be adjusted.

20. The device of claim 15, wherein the sequence of gradient communication tasks for the parameters of the model is obtained by means of:
  sequencing gradient communication tasks for the parameters of each layer in the model based on a back propagation direction to obtain the sequence of gradient communication tasks for the parameters; and
  performing priority setting on each task in the sequence of gradient communication tasks for the parameters, such that the priorities of the gradient communication tasks are sequenced in an ascending order.

* * * * *